(12) United States Patent
Ouchi et al.

(10) Patent No.: US 11,797,841 B2
(45) Date of Patent: Oct. 24, 2023

(54) COMPUTING SYSTEM FOR PERFORMING EFFICIENT MACHINE LEARNING PROCESSING

(71) Applicant: NATIONAL INSTITUTE OF ADVANCED INDUSTRIAL SCIENCE AND TECHNOLOGY, Tokyo (JP)

(72) Inventors: Shinichi Ouchi, Ibaraki (JP); Hiroshi Fuketa, Ibaraki (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 1198 days.

(21) Appl. No.: 16/357,438

(22) Filed: Mar. 19, 2019

(65) Prior Publication Data
US 2019/0294964 A1   Sep. 26, 2019

(30) Foreign Application Priority Data
Mar. 20, 2018   (JP) .................................. 2018-052090

(51) Int. Cl.
*G06N 3/08* (2023.01)
*G06F 7/483* (2006.01)

(52) U.S. Cl.
CPC ............. *G06N 3/08* (2013.01); *G06F 7/483* (2013.01)

(58) Field of Classification Search
CPC .................................. G06N 3/08; G06F 7/483
See application file for complete search history.

(56) References Cited

U.S. PATENT DOCUMENTS 5,974,053 A * 10/1999 Bennett ............... H04L 12/5602
                                                        370/468
10,521,718 B1 * 12/2019 Szegedy ................. G06N 3/084
2002/0026468 A1 * 2/2002 Miyasaka ............. G06F 1/0307
                                                        708/606

(Continued)

OTHER PUBLICATIONS

Norman P. Jouppi et al., "In-Datacenter Performance Analysis of a Tensor Processing UnitTM", [online], Apr. 16, 2017, pp. 1-17, Internet, https://arxiv.org/abs/1704.04760.

*Primary Examiner* — Henry Tsai
*Assistant Examiner* — Aurangzeb Hassan
(74) *Attorney, Agent, or Firm* — Studebaker & Brackett PC

(57) ABSTRACT

A computing system capable of obtaining a calculation speed exceeding that of 16-bit floating point processing while maintaining accuracy of calculation results. A computing system includes a parameter server, a communication path and a worker. The parameter server has a storage unit that stores a parameter value of a training target model, and a first conversion unit that converts the parameter value into data represented by a floating point number with 10 bits or less. The communication path transmits the data transmitted and received between the parameter server and the worker. The worker has a processing unit that computes a product and a sum of the data. The parameter server further has a second conversion unit that converts the data with 10 bits or less received from the worker into an updating difference, and an updating unit that updates the parameter value on the basis of the updating difference.

13 Claims, 6 Drawing Sheets

(56) References Cited

U.S. PATENT DOCUMENTS

| | | | |
|---|---|---|---|
| 2003/0004720 A1* | 1/2003 | Garudadri | G10L 15/30 |
| | | | 704/E15.047 |
| 2016/0085507 A1* | 3/2016 | Kim | G06F 7/483 |
| | | | 708/209 |
| 2016/0211862 A1* | 7/2016 | Ho | H03M 7/06 |
| 2018/0089834 A1* | 3/2018 | Spizhevoy | G06V 10/454 |
| 2019/0073581 A1* | 3/2019 | Chen | G06Q 30/0251 |

* cited by examiner

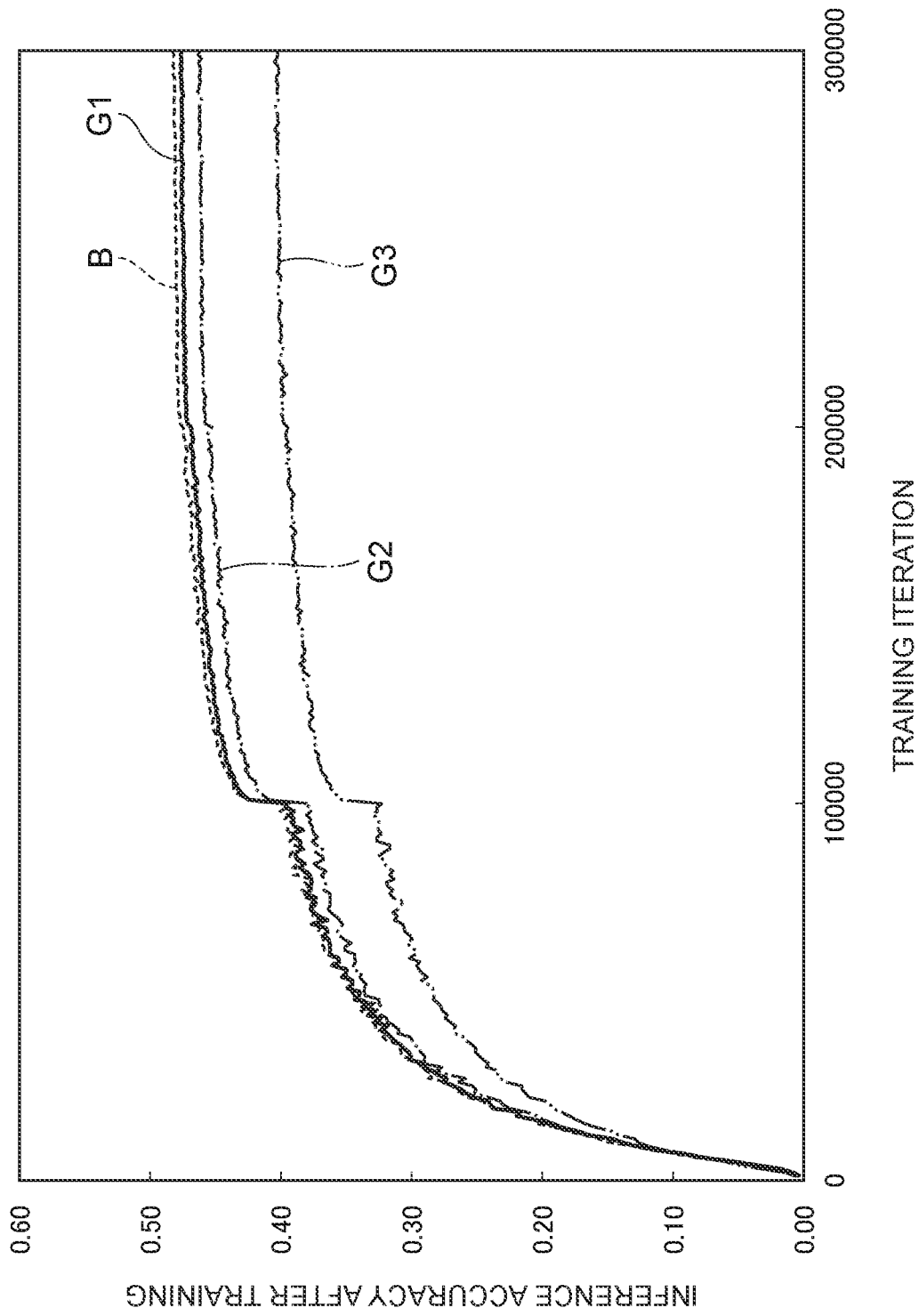

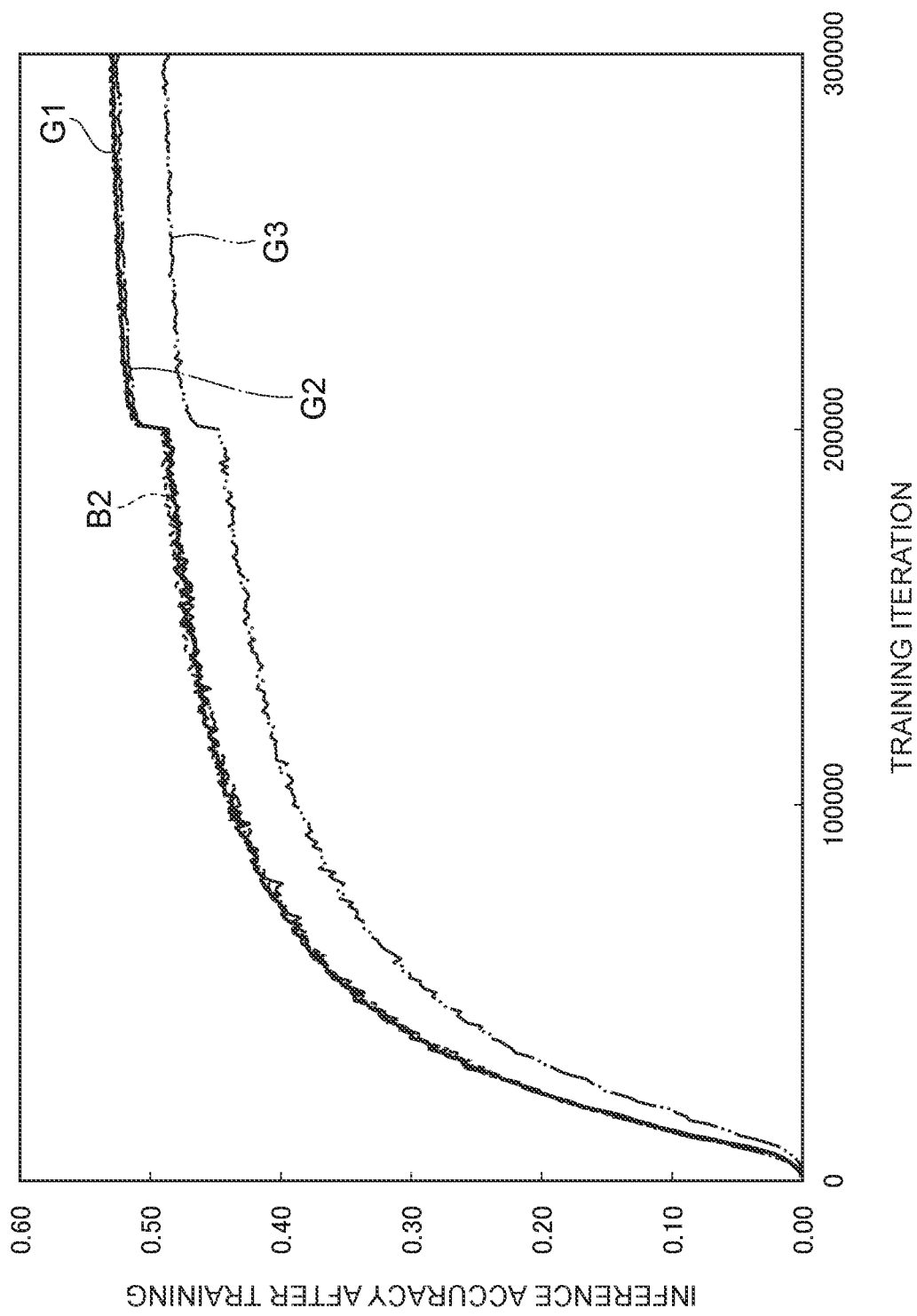

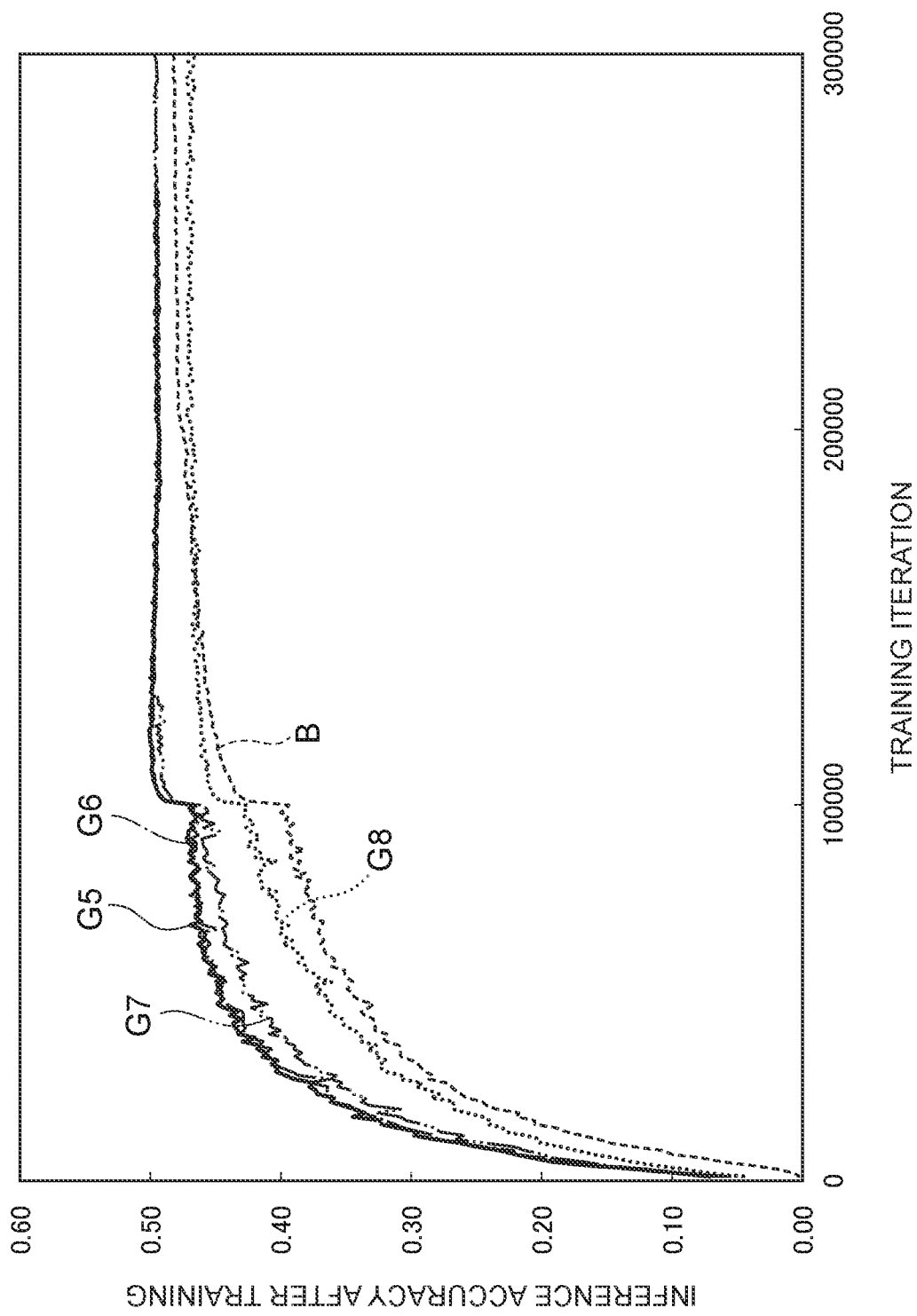

COMPUTING SYSTEM FOR PERFORMING EFFICIENT MACHINE LEARNING PROCESSING

BACKGROUND

Field

The present invention relates to a computing system, and more particularly to a computing system which efficiently performs machine learning processing.

Description of Related Art

In recent years, the speed of machine learning process has been drastically improved by the general purpose computing on graphical processing unit (GPU) (GPGPU: general purpose computing on GPU). In the GPU, 16-bit floating point processing has been introduced for machine learning processing. The purpose is to enhance the parallelism and improve the calculation speed under the constraints of limited hardware resources and power consumption.

SUMMARY

An attempt has also been made to reduce the bit length of data processed by a computing device in order to further enhance the parallelism and increase the calculation speed under constraints of limited hardware resources and power consumption. For example, Norman P. Jouppi, 75 others, "In-Datacenter Performance Analysis of a Tensor Processing Unit™" [online], Apr. 16, 2017, Internet <https://arxiv.org/abs/1704.04760> describes an application specific integrated circuit (ASIC) that introduces 8-bit integer processing and reduces power consumption and increases speed of inference by the trained neural network. However, where the bit length of data is simply decreased in the training process of machine learning processing, machine learning processing becomes difficult. This is apparently due to the influence of the quantization error, the data vanishing, or the loss of trailing digits caused by the decrease in the bit length of data processed in the processing element.

Accordingly, the present invention provides a computing system capable of obtaining a calculation speed exceeding that of 16-bit floating point processing while maintaining calculation accuracy.

A computing system according to one embodiment of the present invention includes a parameter server, a communication path and a processing element, so called "worker", wherein the parameter server has a storage unit that stores a parameter value of a neural network model for the training target represented by a 32-bit floating point number and a first conversion unit that converts the parameter value into data represented by a floating point number represented by 10 bits or less, in which a mantissa is 3 bits or less and an exponent is 6 bits or less; the communication path transmits the data transmitted and received between the parameter server and the worker; the worker has a processing unit that computes a product and a sum of the data; and the parameter server further has a second conversion unit that converts the data received from the worker into a 32-bit floating point number and an updating unit that updates the parameter based on the received data as an updating difference of the parameter.

According to this embodiment, computation of multiply and add for calculating the updating difference of the parameter is performed by data represented by a floating point number represented by 10 bits or less, and the updating of the parameter value is performed by data represented by a 32-bit floating point number, thereby making it possible to obtain a calculation speed exceeding that of 16-bit floating point processing while maintaining the accuracy of the calculation result.

In the above embodiment, the processing unit may perform addition after converting the mantissa of the data to 14 bits or more and 23 bits or less, and convert the mantissa of the data to 3 bits or less after performing the addition.

According to this embodiment, when calculating the sum of many products such as the product of matrices, loss of trailing digits often occurs in the case where the mantissa bit length of an adder is short, but such loss of trailing digits can be avoided and high computation accuracy can be maintained.

In the above embodiment, the exponent of the data may be 6 bits, and the bias value of the exponent may be 31 ($=2^{6-1}-1$) that is about ½ of the maximum representable number of a 6-bit integer.

According to this embodiment, the minimum value and the maximum value necessary for machine learning can be accurately expressed.

Further, in the above embodiment, the exponent of the data may be further reduced by 1 bit to 5 bits, and the bias value of the exponent may be 23 or more and 28 or less.

According to this embodiment, by shifting the bias value to 23 or more and 28 or less when the exponent is 5 bits, it is possible to express accurately a minute value while enabling the expression of the maximum value of the parameter value.

In the above embodiment, the neural network model for the training target may be a neural network including local response normalization.

According to this embodiment, even when the number of bits of the mantissa is 3 or less, the degradation of the inference accuracy of the neural network originating from a quantization error is compensated, and high inference accuracy can be maintained.

In the above embodiment, the neural network model for the training target may be a neural network including batch normalization.

According to this embodiment, even when the number of bits of the mantissa is 3 or less, the degradation of the inference accuracy of the neural network originating from a normalization error is compensated, and high inference accuracy can be maintained.

In the above embodiment, the data may be represented by a floating point number represented by 8 bits or less, in which the mantissa is 2 bits or less.

According to this embodiment, by further shortening the bit length of the mantissa of the data, it is possible to further increase the computation speed of the processing unit, increase the communication speed of the communication path, further scale-down the processing unit hardware, and further reduce power consumption. In addition, by using a neural network including batch normalization, it is possible to obtain the inference accuracy higher than that in the case where the training process is performed using the 32-bit floating point number or the 16-bit floating point number, even though the bit length of the mantissa is shortened.

In the above embodiment, the data may be represented by a floating point number represented by 7 bits or less, in which the mantissa is represented by 1 bit.

According to this embodiment, by further shortening the bit length of the mantissa of the data, it is possible to further increase the computation speed of the processing unit, increase the communication speed of the communication path, further scale-down the processing unit hardware, and further reduce power consumption. In addition, by using a neural network including batch normalization, it is possible to obtain the inference accuracy higher than that in the case where the training process is performed using a 32-bit floating point number or a 16-bit floating point number, even though the bit length of the mantissa is shortened.

According to the present invention, there is provided a computing system capable of obtaining a calculation speed exceeding that of 16-bit floating point processing while maintaining accuracy of calculation results.

BRIEF DESCRIPTION OF DRAWINGS

FIG. 4 is a diagram depicting the inference accuracy when the training process of a neural network is executed by the computing system 1 according to the present embodiment and a computing system according to a reference;

FIG. 5 is a diagram depicting inference accuracy when the training process of a neural network including local response normalization is executed by the computing system 1 according to the present embodiment and the computing system according to the reference; and FIG. 6 is a diagram depicting inference accuracy when the training process of a neural network including batch normalization is executed by the computing system 1 according to the present embodiment and the computing system according to the reference.

DETAILED DESCRIPTION

Figure 1:
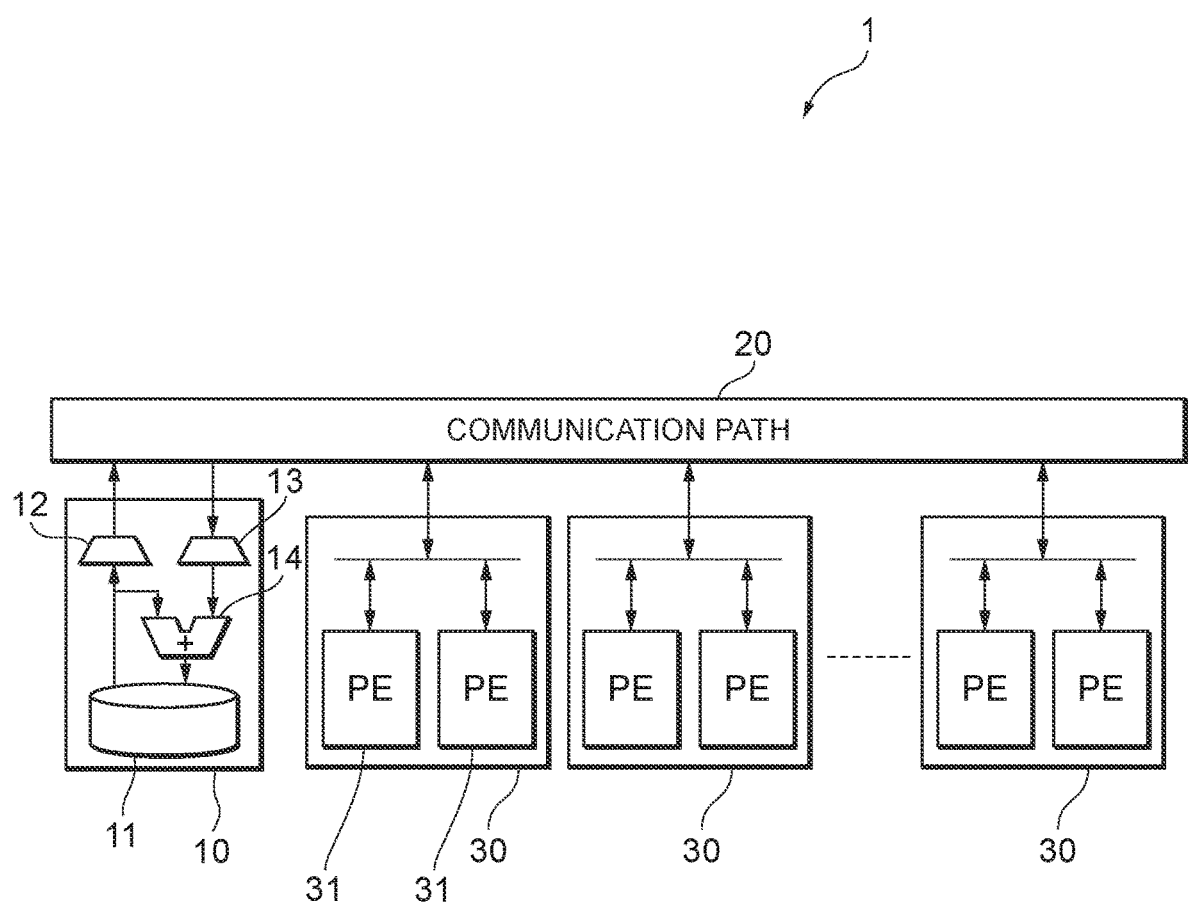
FIG. 1 is a diagram depicting an outline of a computing system 1 according to an embodiment of the present invention.

Hereinafter, an embodiment (hereinafter referred to as "the present embodiment") according to one aspect of the present invention will be described with reference to the drawings. In the drawings, the same reference numerals are given to the same or similar configurations.

FIG. 1 is a diagram depicting an outline of the computing system 1 according to the embodiment of the present invention. The computing system 1 includes a parameter server 10, a communication path 20, and workers 30. Although the figure exemplifies a case where one parameter server 10 and a plurality of workers 30 are provided, the computing system 1 may include a plurality of parameter servers 10.

The parameter server 10 has a storage unit 11 for storing a parameter of a neural network model for the training target represented by a 32-bit floating point number. Here, the training target model may be an arbitrary model, but in the present embodiment, the training target model is assumed to be a neural network. When the training target model is a neural network, the parameter value may be a weighting factor connecting the nodes of the neural network. Further, the parameter value may be represented by a 32-bit floating point number, for example, in which a sign, a mantissa, and an exponent are represented by 1 bit, 23 bits, and 8 bits, respectively. Here, the mantissa represents a fraction of the binary number in which the integer part is 1. That is, in this expression, the mantissa is represented by 23 bits where the 1-bit integer part is omitted. The exponent of the parameter value may be represented by 5 bits or 6 bits, and the exponent may be arbitrarily selected according to the convenience of implementation.

The parameter server 10 has a first conversion unit 12 that converts the parameter value into data represented by a floating point number with 10 bits or less, in which the mantissa is 3 bits or less and the exponent is 6 bits or less. In the case of converting the mantissa to 3 bits, the first conversion unit 12 may round off the fourth bit of the 23-bit mantissa of the parameter value. In the case of converting the mantissa to 2 bits, the first conversion unit 12 may round off the third bit of the 23-bit mantissa of the parameter value. In the case of converting the mantissa to 1 bit, the first conversion unit 12 may round off the second bit of the 23-bit mantissa of the parameter value. Further, when the exponent of the parameter value is e1 in the binary number represented by 8 bits and the bias is B1, the first conversion unit 12 may obtain an exponent e2 after the conversion, which is represented by a binary number, as e2=e1−(B1−B2) where B2 represents the bias after the conversion. It should be noted that B1 may be half of the numerical value that can be represented by 8 bits, that is, $2^{8-1}-1=127$. Further, when the exponent after the conversion is 6 bits, B2 may be half of the numerical value that can be represented by 6 bits, that is, $2^{6-1}-1=31$. In addition, B2 may be 23 or more and 28 or less when the exponent after the conversion is 5 bits.

The communication path 20 transmits data represented by a floating point number with 10 bits or less transmitted and received between the parameter server 10 and the worker 30. In this way, by setting data to be transmitted to the communication path 20 as data represented by a floating point number with 10 bits or less, the amount of exchanged data is reduced and the communication speed is increased by a factor of about three. In addition, the energy required for communication can be reduced by about 70% compared to the case of transmitting data represented by a 16-bit floating point number.

The worker 30 has a processing unit 31 that computes the product and sum of data represented by a floating point number with 10 bits or less. The processing unit 31 may execute arbitrary multiplication and addition. For example, in the case where the model for the training target is a neural network, a matrix of weight parameters of a certain layer l is expressed as $W^{(l)}$, a matrix of activation output from the layer l is represented as $Z^{(l)}$, a matrix of map output from the layer l is expressed as $U^{(l)}$, and forward propagation is calculated by the following formula 1.

$$\left. \begin{array}{l} U^{(l)} = W^{(l)} Z^{(l-1)} \\ Z^{(l)} = f(U^{(l)}) \end{array} \right\} \quad \text{[Formula. 1]}$$

Here, f is an activation function, and may be, for example, a rectified linear unit (ReLU). In this way, the processing unit 31 will perform massive calculation of the product of matrices such as $W^{(l)} Z^{(l-1)}$, and a large number of multiplications and additions will be repeatedly executed. In this case, the worker 30 receives the weight parameter matrix $W^{(l)}$ from the parameter server 10 via the communication path 20. Then, the output value of the output layer is transmitted to the parameter server 10 via the communication path 20.

In the case where the model for the training target is a neural network, the processing unit 31 may perform training process of the neural network by an error back propagation method according to formula 2 below. Here, the matrix of the errors of the layer l is denoted by $\Delta^{(l)}$, the first derivative of the function f is represented by f', the gradient matrix obtained by partial differentiation of the loss by the weight parameter is represented by $\partial W^{(l)}$, and the number of learning data included in a minibatch is represented by N. In addition, the operator "O" represents the product (Hadamard product) for each element of the matrix, and the symbol "T" represents the transpose of the matrix.

$$\left. \begin{array}{l} \Delta^{(l)} = f^{(l)\prime}(U^{(l)}) \circ (W^{(l+1)T}\Delta^{(l+1)}) \\ \partial W^{(l)} = \frac{1}{N}\Delta^{(l)}Z^{(l-1)T} \end{array} \right\}$$ [Formula. 2]

In this case, the worker 30 receives the weight matrix $W^{(l)}$ from the parameter server 10 via the communication path 20. Then, the gradient $\partial W^{(l)}$ is calculated by the worker 30 and transmitted to the parameter server 10 via the communication path 20.

The parameter server 10 has a second conversion unit 13 that converts data received from the worker 30 into an updating difference represented by a 32-bit floating point number. When the mantissa of the data received from the worker 30 is 3 bits, the second conversion unit 13 may convert the mantissa to 23 bits by padding 0 for the extended 20 bits. The same operation is applied to the cases where the mantissa of the data received from the worker 30 is 2 bits and 1 bit. Further, when the exponent of the data received from the worker 30 is e2 as the binary number and the bias is B2, the second conversion unit 13 converts e1 as an 8-bit binary number by e1=e2−(B2−B1) where the bias after the conversion is represented by B1.

The parameter server 10 has an updating unit 14 that updates the weight parameter on the basis of the updating difference. For example, when the model for the training target is a neural network, the parameter value is a matrix of weight parameters represented by $W^{(l)}$, and the gradient $\partial W^{(l)}$ is received from the worker 30, the updating unit 14 updates the weight parameter matrix $W^{(l)}$ by the following formula 3.

$$\left. \begin{array}{l} \Delta W^{(l)} = \mu \Delta W^{(l)\prime} - \epsilon \partial W^{(l)} \\ W^{(l)} \leftarrow W^{(l)} + \Delta W^{(l)} \end{array} \right\}$$ [Formula. 3]

Here, $\Delta W^{(l)\prime}$ is a value used for updating the previous parameter value, and $\mu$ is a momentum. The present example illustrates the updating of parameter values using the momentum method, but other updating methods (for example, Adagrad or Adam) may be used instead of the momentum method.

The first conversion unit 12 converts a parameter value represented by a 32-bit floating point number into data represented by a floating point number with 10 bits or less, in which the exponent is represented by 5 bits or 6 bits and the bias value of the exponent is 23 or more and 28 or less in particular when the exponent is 5 bits. When the model for the training target is a neural network, the weight parameter $W^{(l)}$ and the output activation $Z^{(l)}$ rarely take values larger than 10 or larger than 100. Therefore, by setting the bias value to 23 to 28 when the exponent is 5 bits and setting the maximum of data that can be represented from $2 \times 2^{31-28}=16$ to $2 \times 2^{31-23}=512$, it is possible to express accurately a minute value while enabling the expression of the maximum value of the parameter value. That is, when the exponent is 5 bits and the bias value of the exponent is 23 or more and 28 or less, a value of from about $10^{-7}$ to $10^3$ are expressed, which avoids the data vanishing and maintains high training accuracy for major neural network models.

The first conversion unit 12 may convert a parameter value represented by a 32-bit floating point number into data represented by a floating point number with 10 bits or less, in which the exponent is 6 bits and the bias value of the exponent is 31. By setting the bias value to 31 when the exponent is 6 bits, data with values from about $10^{-7}$ to $10^3$ are represented, which avoids data vanishing and maintains high training accuracy for major neural network models.

With the computing system 1 according to the present embodiment, by converting the parameter value represented by a 32-bit floating point number into data represented by a floating point number with 10 bits or less, it is possible to reduce the energy required for transmitting and receiving data between the parameter server 10 and the worker 30 to 10/32 or less. In other words, it is possible to transmit and receive data at a rate higher by a factor of 3.2 or more under the same power consumption conditions.

Further, since the hardware scale of the multiplier of the worker 30 is approximately $(1+b_m)^2$ with respect to the bit number $b_m$ of the mantissa, by converting the mantissa from 23 bits to 3 bits or less, it is possible to reduce the hardware scale of the multiplier to about $(1+3)^2/(1+23)^2=0.03$, that is, to approximately 3% or less.

Figure 2:
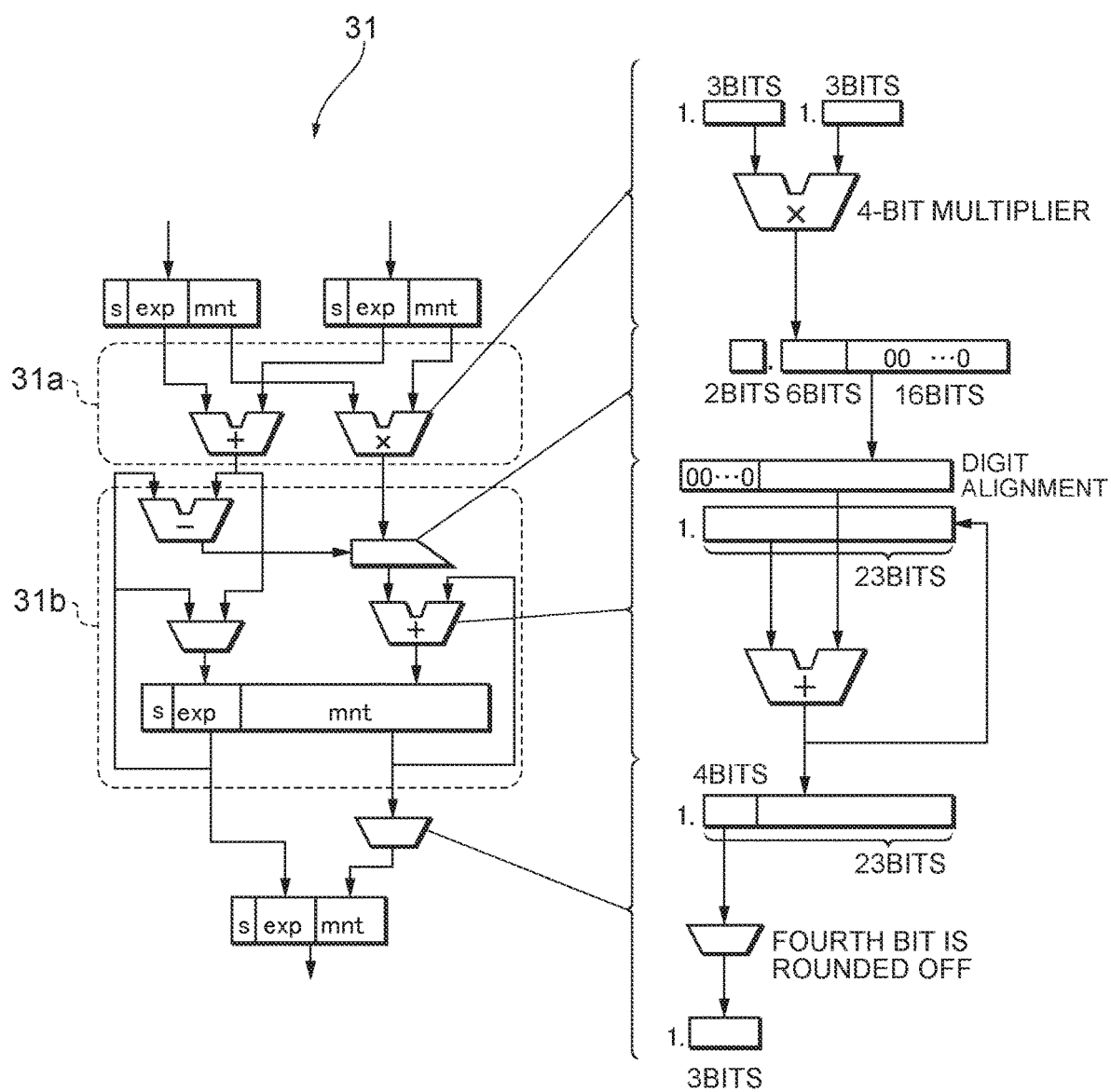
FIG. 2 is a diagram depicting the process executed by a worker according to the present embodiment.

FIG. 2 is a diagram depicting process executed by the worker 30 according to the present embodiment. The figure depicts the functional configuration of the processing unit 31 and the processing executed by each configuration.

The processing unit 31 includes a multiplier 31a and an adder 31b. For example, when calculating the product of matrices such as $W^{(l)} Z^{(l-1)}$, it is necessary to calculate the inner product of the row vectors constituting $W^{(l)}$ and the column vectors constituting $Z^{(l-1)}$ and it is also necessary to execute computing that sums up the products of elements. The figure depicts the process in which the elements of the row vectors and the elements of the column vectors are multiplied by the multiplier 31a, and the numerical value output from the multiplier 31a is added to the register value of the adder 31b to obtain the partial sum which is written back to the register. This process may be implemented in another implementation form such as a systolic array. In the following description, it is assumed that the data input and output by the processing unit 31 are data represented by a 10-bit floating point number in which the mantissa is 3 bits and the exponent is 6 bits. However, the data input to and output from the processing unit 31 may be data represented by an 8-bit floating point number in which the mantissa is 2 bits and the exponent is 5 bits, or data represented by a 7-bit floating point number in which the mantissa is 1 bit and the exponent is 5 bits.

The multiplier 31a adds the 6-bit exponent (exp) and multiplies by the 3-bit mantissa from the two data represented by a 10-bit floating point number. Here, the multiplication of the 3-bit mantissa is executed by a multiplier (4-bit multiplier) which can represent at least 4 bits in order to correctly handle the carry. It is to be noted that in FIG. 2, it is shown that the fraction excluding the integer part, 1, is represented by the 3-bit mantissa.

The processing unit 31 converts the mantissa of the data into 14 bits or more and 23 bits or less, then performs addition, and converts the mantissa of the data to 3 bits or less after performing the addition. More specifically, the adder 31b of the processing unit 31 stores the calculated partial sum in a register with the data in which the mantissa is represented by 14 bits or more and 23 bits or less, and when a new product is calculated by the multiplier 31*a*, the adder converts the mantissa of the numerical value thereof to 14 bits or more and 23 bits or less and adds the converted mantissa to the partial sum stored in the register. In the present example, the partial sum in which the mantissa is represented by 23 bits is stored in the register of the adder 31*b*.

The adder 31*b* calculates the difference between the exponent of the partial sum stored in the register and the exponent of the value calculated by the multiplier 31*a* and performs the digit alignment for adding the value calculated by the multiplier 31*a* to the partial sum. The product of the mantissa calculated by the multiplier 31*a* is represented by 2 bits in the integer part and 6 bits in the fraction part, and the adder 31*b* performs 0-padding to extend 16 bits, namely to obtain a total of 24 bits. Thereafter, by performing the digit alignment with the partial sum stored in the register, addition is performed with respect to the 23-bit mantissas including the hidden integer bits. The adder 31*b* repeats such process to update the partial sum stored in the register and calculates the inner product (each element of the product of the matrices) of the vectors.

When the partial summing is ended and a set of computations is completed, the processing unit 31 reads out values of the exponent and mantissa stored in the register, and rounds off the fourth bit by cutting out upper four bits of the mantissa to convert the mantissa to a 3-bit mantissa. Where the mantissa of the input data is 2 bits, the processing unit 31 rounds off the third bit by cutting out upper three bits of the mantissa stored in the register and converts the mantissa to a 2-bit mantissa. Where the mantissa of the input data is 1 bit, the processing unit 31 rounds off the second bit by cutting out upper two bits of the mantissa stored in the register and converts the mantissa to a 1-bit mantissa.

In the case of calculating repeatedly a large number of sums and products such as products of matrices with the processing unit 31, where the mantissa bit length of the adder 31*b* is short, loss of trailing digits sometimes occurs. With the computing system 1 according to the present embodiment, the addition is performed after converting the mantissa of data to 14 bits or more and 23 bits or less, and the mantissa of data is converted to 3 bits or less after all the additions are completed, thereby making it possible to avoid such loss of trailing digits and maintain high computing accuracy.

Figure 3:
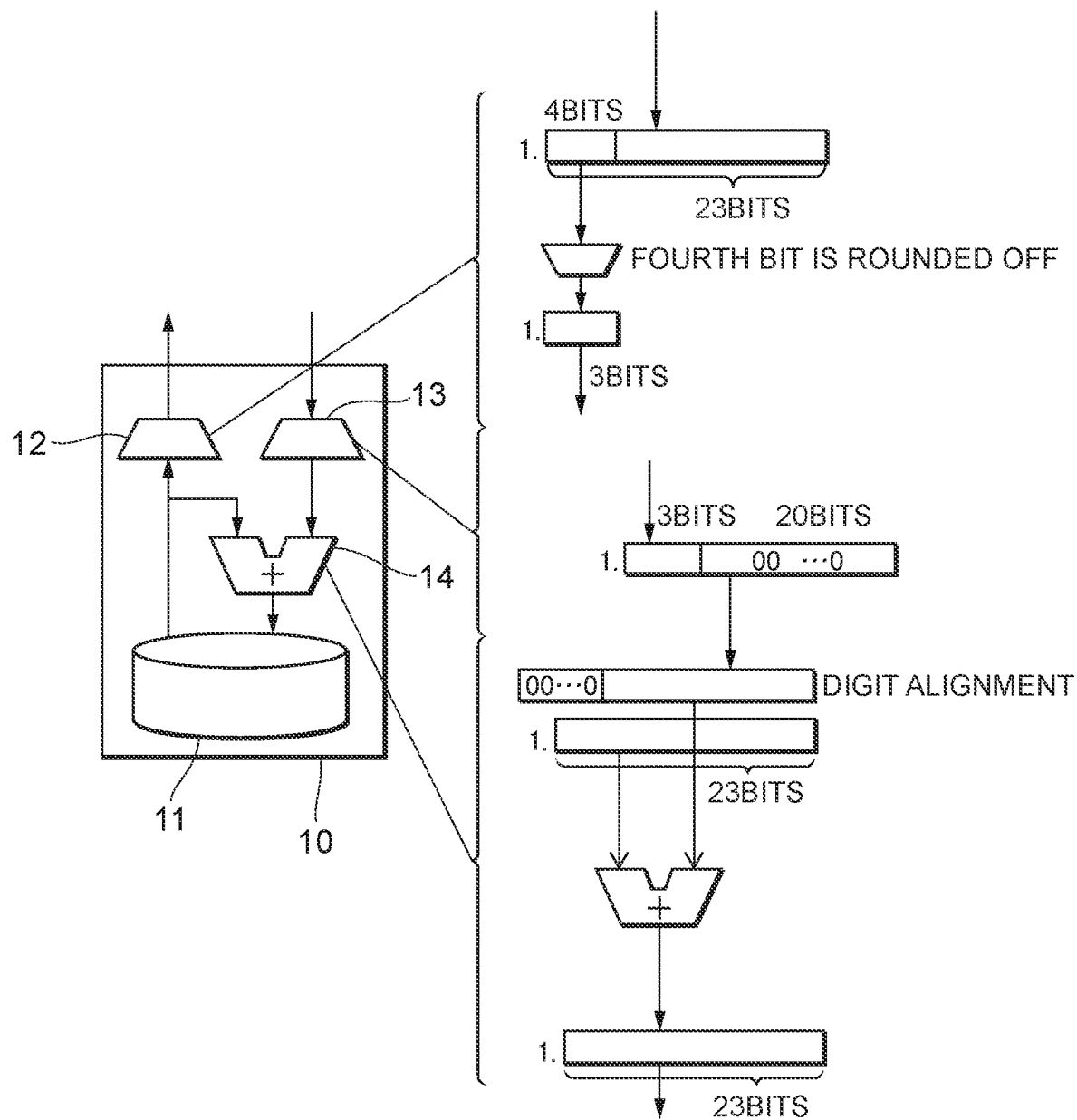
FIG. 3 is a diagram depicting the process executed by a parameter server according to the present embodiment.

FIG. 3 is a diagram depicting process executed by the parameter server 10 according to the present embodiment. The first conversion unit 12 of the parameter server 10 converts a parameter value represented by a 32-bit floating point number into data represented by a floating point number with 10 bits or less, in which the mantissa is 3 bits or less and the exponent is 6 bits or less. In the present example, the first conversion unit 12 extracts the more significant four bits of the parameter value in which the mantissa is represented by 23 bits, rounds off the fourth bit, and converts the mantissa into 3 bits.

The second conversion unit 13 converts the data received from the worker 30 into an updating difference represented by a 32-bit floating point number. In the case of the present example, the second conversion unit 13 performs 0-padding to the 3-bit data received from the worker 30 to extend 20 bits, namely to obtain a total of 23 bits.

The updating unit 14 updates the parameter value on the basis of the updating difference. In the case of the present example, the updating unit 14 performs the digit alignment of the parameter value stored in the storage unit 11 and the updating difference and adds the 23-bit mantissa to update the parameter value represented by the 32-bit floating point number in which the mantissa is 23 bits and the exponent is 8 bits.

With the computing system 1 according to the present embodiment, the product and sum for calculating the updating difference of the parameter are computed using data represented by a floating point number with 10 bits or less, and the parameter value is updated using data represented by a 32-bit floating point number, thereby making it possible to obtain a calculation speed exceeding that of 16-bit floating point processing while maintaining the accuracy of the calculation result. For example, in major neural network models such as AlexNet exemplified hereinbelow, since the updating difference of the weight parameter is distributed around $10^{-4}$, a mantissa accuracy of about 6 digits in a decimal number, that is, 18 to 19 bits or more in a binary number, is needed in the parameter server 10. With the computing system 1 according to the present embodiment, the parameter value in the parameter server 10 is updated using data represented by a 32-bit floating point number, whereby loss of trailing digits is prevented and such accuracy is ensured.

FIG. 4 is a diagram depicting the inference accuracy when training process of a neural network is executed by the computing system 1 according to the present embodiment and a computing system according to a reference. The neural network model used in the present example is AlexNet. In the figure, the inference accuracy is shown as a function of the number of training iterations. A solid line G1 represents the inference accuracy in the case where the parameter value is converted by the first conversion unit 12 of the computing system 1 into data represented by a 10-bit floating point number in which the mantissa is 4 bits and the exponent is 5 bits, and a dot-dash line G2 represents the inference accuracy in the case where the parameter value is converted by the first conversion unit 12 of the computing system 1 into data represented by a 9-bit floating point number in which the mantissa is 3 bits and the exponent is 5 bits. In addition, a two-dot-dash line G3 represents the inference accuracy in the case where the parameter value is converted by the first conversion unit 12 of the computing system 1 into data represented by a 8-bit floating point number in which the mantissa is 2 bits and the exponent is 5 bits. Further, as a reference, a broken line B represents the inference accuracy in the case where the entire processing is performed with the data represented by a 32-bit floating point number.

In the case of using data represented by a 10-bit floating point number in which the mantissa is 4 bits and the exponent is 5 bits (graph G1), the inference accuracy increases with the number of training iterations along almost the same curve as in the reference (graph B). Further, in the case of using data represented by a 9-bit floating-point number in which the mantissa is 3 bits and the exponent is 5 bits as in the computing system 1 according to the present embodiment (graph G2), the inference accuracy is sufficiently high, although slightly lower than in the case of the reference (graph B), as the number of training iterations increases. In the case of using data represented by an 8-bit floating-point number, in which the mantissa is 2 bits and the exponent is 5 bits as in the computing system 1 according to the present embodiment (graph G3), the degradation of inference accuracy is suppressed to be within 7% to 8% with respect to the case of the reference (graph B).

As described above, with the computing system 1 of the present embodiment, by converting the parameter value represented by a 32-bit floating point number into the data represented by a floating point number with 10 bits or less, the neural network model for the training target can be trained without significantly impairing the inference accuracy as compared with the case of using a 32-bit floating point number, while greatly reducing the energy required for data transmission and reception between the parameter server 10 and the worker 30 and the hardware scale of the multiplier 31*a* of the worker 30.

FIG. 5 is a diagram depicting the inference accuracy as a function of the training iteration when training process of a neural network including local response normalization is executed by the computing system 1 according to the present embodiment. The neural network model used in the present example is a model in which local response normalization is performed on the output of the activation function of each layer of AlexNet. In the figure, a solid line G1 represents a relationship between the number of training iterations and the inference accuracy in the case where the parameter value is converted by the first conversion unit 12 of the computing system 1 into data represented by a 10-bit floating point number in which the mantissa is 4 bits and the exponent is 5 bits. Further, a dot-dash line G2 represents a relationship between the number of training iterations and the inference accuracy in the case where the parameter value is converted by the first conversion unit 12 of the computing system 1 into data represented by a 9-bit floating point number in which the mantissa is 3 bits and the exponent is 5 bits. In addition, a two-dot-dash line G3 represents a relationship between the number of training iterations and the inference accuracy in the case where the parameter value is converted by the first conversion unit 12 of the computing system 1 into data represented by a 8-bit floating point number in which the mantissa is 2 bits and the exponent is 5 bits. Further, as a reference, a broken line B2 represents a relationship between the number of training iterations and the inference accuracy in the case where the entire processing is performed with the data represented by a 32-bit floating point number in a network model in which local response normalization is performed on the output of the activation function of each layer.

In the case of using data represented by a 10-bit floating point number in which the mantissa is 4 bits and the exponent is 5 bits (graph G1), the inference accuracy of the neural network including local response normalization increases with the number of training iterations along almost the same curve as in the reference (graph B2). Further, in the case of using data represented by a 9-bit floating-point number in which the mantissa is 3 bits and the exponent is 5 bits as in the computing system 1 according to the present embodiment (graph G2), the inference accuracy of the neural network including local response normalization rises with the number of training iterations along almost the same curve as in the reference (graph B2). In addition, in the case of using data represented by a 8-bit floating-point number in which the mantissa is 2 bits and the exponent is 5 bits as in the computing system 1 according to the present embodiment (graph G3), the inference accuracy of the neural network including local response normalization is several percent lower than that in the reference (graph B2), but is still sufficiently high.

As described above, with the computing system 1 according to the present embodiment, by using a neural network including local response normalization as a neural network model for the training target, it is possible to compensate the degradation of inference accuracy of the neural network originating from a quantization error and maintain high inference accuracy, even though the number of bits of the mantissa is 3 bits or less.

FIG. 6 is a diagram depicting the inference accuracy as a function of the number of training iterations when the training process of a neural network including batch normalization is executed by the computing system 1 according to the present embodiment and a computing system according to a reference. The neural network model used in the present example is a model in which batch normalization is performed on the output of the convolution layer and the output of all coupling layers of AlexNet. Also, the neural network model used in the computing system according to the reference is AlexNet. In the figure, a solid line G5 represents a relationship between the number of training iterations and the inference accuracy in the case where the parameter value is converted by the first conversion unit 12 of the computing system 1 into data represented by a 17-bit floating point number in which the mantissa is 10 bits and the exponent is 6 bits. Further, a dot-dash line G6 represents a relationship between the number of training iterations and the inference accuracy in the case where the parameter value is converted by the first conversion unit 12 of the computing system 1 into data represented by a 10-bit floating point number in which the mantissa is 3 bits and the exponent is 6 bits. In addition, a two-dot-dash line G7 represents a relationship between the number of training iterations and the inference accuracy in the case where the parameter value is converted by the first conversion unit 12 of the computing system 1 into data represented by a 9-bit floating point number in which the mantissa is 2 bits and the exponent is 6 bits. Further, a dot line G8 represents a relationship between the number of training iterations and the inference accuracy in the case where the parameter value is converted by the first conversion unit 12 of the computing system 1 into data represented by a 8-bit floating point number in which the mantissa is 1 bit and the exponent is 6 bits. Furthermore, as a reference, a broken line B represents a relationship between the number of training iterations and the inference accuracy in the case where the entire processing is performed with the data represented by a 32-bit floating point number.

In the case of using data represented by a 17-bit floating point number in which the mantissa is 10 bits and the exponent is 6 bits (graph G5), the inference accuracy of the neural network including batch normalization rises with the number of training iterations faster than in the case of the reference (graph B). Further, in the case of using data represented by a 10-bit floating-point number in which the mantissa is 3 bits and the exponent is 6 bits as in the computing system 1 according to the present embodiment (graph G6), the inference accuracy of the neural network including batch normalization rises with the number of training iterations along almost the same curve as in the case of graph G5 and faster than in the case of the reference (graph B). In addition, in the case of using data represented by a 9-bit floating-point number in which the mantissa is 2 bits and the exponent is 6 bits (graph G7), the inference accuracy of the neural network including batch normalization rises slightly slower than in graph G5 and faster than in the case of the reference (graph B). Furthermore, in the case of using data represented by an 8-bit floating-point number in which the mantissa is 1 bit and the exponent is 6 bits (graph G8), the inference accuracy of the neural network including batch normalization rises slower than in graph G5 and faster than in the case of the reference (graph B).

As described above, with the computing system 1 according to the present embodiment, by using a neural network including batch normalization as a neural network model for the training target, it is possible to compensate the degradation of inference accuracy of the neural network originating from a quantization error and maintain high inference accuracy, even though the number of bits of the mantissa is 3 bits or less. Further, in the present example, the exponent was assumed to be 6 bits in all cases, but similar results can be obtained also when the exponent is, for example, 5 bits and the bias value is 25.

More specifically, the first conversion unit 12 may convert the parameter value into data represented by a floating point number with 8 bits or less, in which the mantissa is 2 bits or less and the exponent is 5 bits. In addition, the first conversion unit 12 may convert the parameter value into data represented by a 7-bit floating point number in which the mantissa is 1 bit and the exponent is 5 bits. In this manner, by further shortening the bit length of the mantissa of the data, it is possible to further increase the calculation speed in the processing unit 31, to increase the communication speed in the communication path 20, further reduce the hardware scale of the processing unit 31, and further reduce the power consumption. Moreover, by using a neural network including batch normalization, it is possible to obtain the inference accuracy higher than that obtained when performing the conventional learning processing using a 32-bit floating point number or a 16-bit floating point number, even though the bit length of the mantissa is shortened.

The embodiments described above are for facilitating the understanding of the present invention and are not intended to limit the present invention. The elements, arrangement thereof, materials, conditions, shape, size, and the like in the embodiments are not limited to those exemplified hereinabove and can be appropriately changed. In addition, it is possible to partially replace or combine the configurations shown in different embodiments.

For example, when the number of bits used in the computing system 1 is reduced, a problem of overflow may occur, and in the related art, a symbol representing infinity can be returned in some cases when an overflow occurs, but in the computing system 1 of the present embodiment, the overflow may be saturated to the representable maximum value. As a result, when overflow occurs but falls within the allowable error range, calculation can be continued in the real number domain, and significant calculation results can be obtained.

What is claimed is:

1. A computing system comprising a parameter server, a communication path and a worker, wherein
    the parameter server includes
        a storage unit that stores a parameter value of a training target model represented by a 32-bit floating point number, and
        a first conversion unit that converts the parameter value into data represented by a floating point with 10 bits or less, in which a mantissa is 3 bits or less and an exponent is 6 bits or less;
    the communication path transmits the data transmitted and received between the parameter server and the worker;
    the worker includes a processing unit that computes a product and a sum of the data; and
    the parameter server further includes
        a second conversion unit that converts the data received from the worker into an updating difference represented by a 32-bit floating point number, and
        an updating unit that updates the parameter value on the basis of the updating difference,
    wherein, as a result of converting the parameter into the data:
        energy required for transmitting and receiving the data between the parameter server and the worker is reduced as compared to energy required for transmitting and receiving the parameter between the parameter server and the worker, and
        a hardware scale of the processing unit of the worker is reduced.

2. The computing system according to claim 1, wherein the processing unit performs addition after converting the mantissas of the data to 14 bits or more and 23 bits or less, and converts the mantissa of the datum to 3 bits or less after performing the addition.

3. The computing system according to claim 1, wherein the exponent of the datum is 6 bits, and a bias value of the exponent is 31.

4. The computing system according to claim 1, wherein the exponent of the datum is 5 bits, and a bias value of the exponent is 23 or more and 28 or less.

5. The computing system according to claim 1, wherein the neural network model for the training target is a neural network including local response normalization.

6. The computing system according to claim 1, wherein the training target model is a neural network including batch normalization.

7. The computing system according to claim 6, wherein the datum is represented by a floating point number with 8 bits or less, in which the mantissa is 2 bits or less.

8. The computing system according to claim 6, wherein the datum is represented by a floating point number with 7 bits or less, in which the mantissa is 1 bit.

9. The computing system according to claim 1, wherein, as a further result of converting the parameter into the datum, a rate of transmission and reception of the data between the parameter server and the worker is increased by a factor of at least 3.2 relative to a rate of transmission and reception of the parameter between the parameter server and the worker without increasing power consumption conditions.

10. The computing system according to claim 1, wherein the hardware scale of the multiplier of the worker is reduced to 3% or less of a hardware scale of a multiplier for the parameter.

11. The computing system according to claim 1, wherein the processing unit includes a multiplier and an adder that process the data received from the parameter server, the multiplier computes the product, and the adder computes the sum.

12. The computing system according to claim 1, wherein the data includes two data represented by a floating point format with 10 bits or less, in which a mantissa is 3 bits or less and an exponent is 6 bits or less, and
    the processing unit of the worker:
        performs multiplication on the two data including addition of the exponents of the two data and multiplication of the mantissas of the two data,
        converts a product as a result of the multiplication of the mantissas to be represented by 14 bits or more and 23 bits or less, and stores the converted product in a local register with 14 bits or more and 23 bits or less in the processing unit itself.

13. The computing system according to claim 12, wherein the processing unit of the worker:
  further performs addition of the converted product and a partial sum stored in the local register to update the partial sum in the local register until summation to get a partial sum is ended, and
  converts the finally updated partial sum to the datum having a mantissa represented by 3-bits or less.

\* \* \* \* \*